United States Patent [19]
Yamagiwa et al.

[11] Patent Number: 5,894,874
[45] Date of Patent: Apr. 20, 1999

[54] TIRE TUBE CONTAINING ELASTICS MEMBERS

[75] Inventors: Toshio Yamagiwa; Hirohisa Takahashi; Kengo Nakayama; Katsutoshi Yamazaki, all of Saitama, Japan

[73] Assignee: Honda Giken Kogyo Kabushiki Kaisha, Tokyo, Japan

[21] Appl. No.: 08/884,647

[22] Filed: Jun. 27, 1997

[30] Foreign Application Priority Data

Jun. 27, 1996 [JP] Japan ............................ 8-168008

[51] Int. Cl.$^6$ ................... B60C 17/06; B60C 5/00; B60C 5/02; B60C 19/00
[52] U.S. Cl. ............... 152/158; 152/313; 152/317; 152/336.1; 152/520
[58] Field of Search ................... 152/317, 313, 152/310, 157, 158, 336.1, 520; 428/34.1, 35.7, 36.5, 36.8

[56] References Cited

U.S. PATENT DOCUMENTS

| | | | |
|---|---|---|---|
| 475,785 | 5/1892 | Mason | 152/317 |
| 488,061 | 12/1892 | Bunker | 152/157 X |
| 492,280 | 2/1893 | Fisher | 152/336.1 |
| 1,310,113 | 7/1919 | Culmer | 152/317 |
| 1,313,749 | 8/1919 | Small | 152/317 X |
| 1,332,953 | 3/1920 | Richards | 152/317 X |
| 1,791,935 | 2/1931 | Omenitsch | 152/313 X |
| 1,862,693 | 6/1932 | Martin | 152/317 X |
| 3,256,123 | 6/1966 | Hart | 152/317 X |

FOREIGN PATENT DOCUMENTS

| | | | |
|---|---|---|---|
| 368582 | 12/1906 | France | 152/336.1 |
| A-5201213 | 8/1993 | Japan. | |

*Primary Examiner*—Adrienne C. Johnstone
*Attorney, Agent, or Firm*—Birch, Stewart, Kolasch & Birch, LLP

[57] ABSTRACT

A tube or tubeless tire, which can be punctured and still allow a vehicle to continue running, includes a plurality of spherical members formed of foamed rubber or foamed urethane. The spherical members are contained inside an air chamber of the tire and occupy 50% to 80% of the volume of the air chamber of an inflated tire.

11 Claims, 3 Drawing Sheets

5,894,874

TIRE TUBE CONTAINING ELASTICS MEMBERS

BACKGROUND OF THE INVENTION

1. Field of the Invention

The present invention relates to a tube tire and a tubeless tire, both capable of operating even when punctured.

2. Description of the Background Art

A conventional tire structure for resisting puncture is known from Japanese Patent Laid-open No. 5-201213, for example. In this conventional tire structure, a sectionally crescent-shaped cushion formed of a rubber composition is interposed between a tread portion and a tube of a tire. If the tread portion of the tire is pierced by a nail or similar object, the tube inside of the cushion is afforded some protection from the tip of the nail or object.

In the above conventional tire structure, however, the occurrence of a puncture to the tube cannot be completely avoided. Furthermore, during normal running of a vehicle, the cushion repeatedly receives a load and becomes compressed. After extended use, the cushion suffers a reduction in volume and an increase in hardness, thus reducing its puncture resistant performance.

SUMMARY OF THE INVENTION

Accordingly, it is an object of the present invention to provide a tube tire and a tubeless tire which are capable of allowing a vehicle to continue running even when the tire is punctured.

Further, it is an object of the present invention to provide a tube tire and a tubeless tire which can maintain performance even after long-term use.

Further, it is an object of the present invention to provide a tube tire and tubeless tire which are easy to manufacture.

According to one aspect of the present invention, a tube for a tire is provided, wherein the tube includes a plurality of elastic members contained therein.

According to individual related aspects of the present invention: a total volume of the plurality of elastic members is 50 to 80 percent of a volume of the tube when the tube is inflated to a size fitting the tire; at least one of the plurality of elastic members is made of foamed rubber or foamed urethane; at least one of the plurality of elastic members is free to move about inside the tube; at least one of the plurality of elastic members has an edgeless smooth shape; or at least one of the plurality of elastic members is spherical in shape.

According to a further aspect of the invention, a tire for a vehicle is provided, wherein the tire includes a substantially U-shaped cross-section which opens towards a radial center of the tire and which extends in a continuous circle about the radial center of the tire, and a plurality of elastic members are located inside the U-shaped cross-section.

According to further individual related aspects of the present invention: a total volume of the plurality of elastic members is 50 to 80 percent of a total volume of the U-shaped cross section when the U-shaped crosssection is connected at its upper ends by a rim along the continuous circle about the radial center; at least one of the plurality of elastic members is made of foamed rubber or foamed urethane; at least one of the plurality of elastic members is free to move about inside the U-shaped cross-section; at least one of the plurality of elastic members has an edgeless smooth shape; at least one of the plurality of elastic members is spherical in shape; the tire also includes at least a bag and at least one of the plurality of elastic members is contained inside the at least one bag, and the at least one bag is located inside the U-shaped cross-section; or the at least one bag is a plurality of bags, each of the plurality of bags being located inside the U-shaped cross-section.

According to yet a further aspect of the invention, a vehicle wheel assembly is provided which includes a rim, a tire mounted on the rim, an air chamber formed inside the tire, and a plurality of elastic members contained in the air chamber.

According to yet further individual related aspects of the present invention: the wheel assembly further includes a tube resting upon an inside surface of the tire and an outer surface of the rim, so as to define the air chamber; a total volume of the plurality of elastic members is 50 to 80 percent of a volume of the air chamber; at least one of the plurality of elastic members is made of foamed rubber or foamed urethane; at least one of the plurality of elastic members is free to move about inside the tube; or at least one of the plurality of elastic members is spherical in shape.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
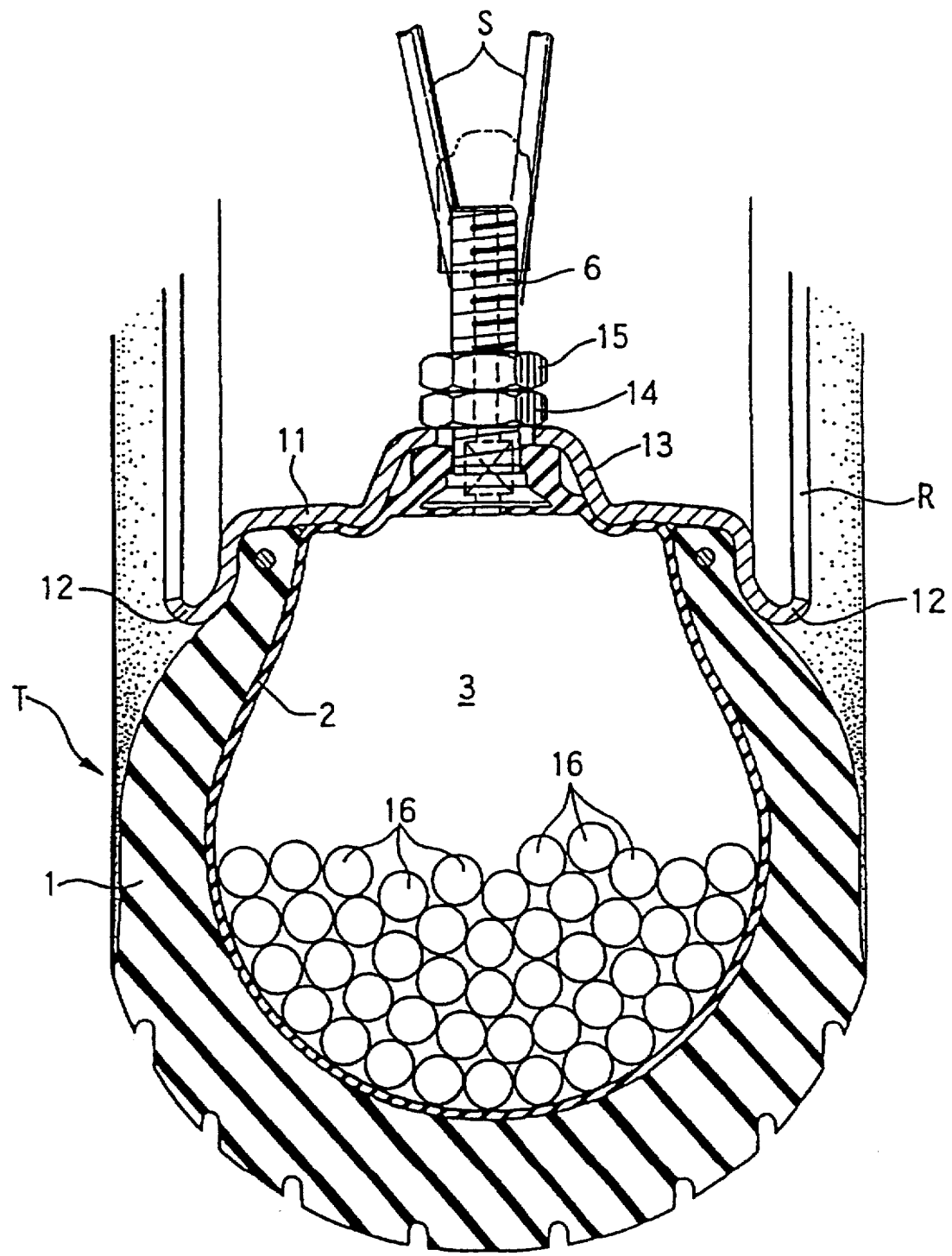
FIG. 1 is a transverse sectional view of a wheel on which a tube tire is mounted.

Referring in detail to the drawings and with particular reference to FIG. 1, a rim R of a wheel for a motorcycle is connected through a plurality of wire spokes S to a hub (not shown). A tube tire T includes a tire 1 and a tube 2 accommodated in the tire 1. The tube tire T is mounted on the rim R. The rim R is provided with an annular rim body portion 11 extending in the circumferential direction of the tube tire T and a pair of flange portions 12 extending radially outward from the axial opposite ends of the rim body portion 11 to retain the inner circumference of the tire 1.

The tube 2 is provided with an air valve 6 for charging air into an air chamber 3 defined in the tube 2. The air valve 6 is passed through an air valve mounting portion 13 formed at one circumferential position of the rim body portion 11, and is fixed to the air valve mounting portion 13 by nuts 14 and 15.

A plurality of spherical members 16 formed of foamed rubber or foamed urethane are located in the air chamber 3 of the tube 2. The amount (total volume) of the spherical members 16 is approximately 50% to 80% of the volume of the tube 2 in its expanded (inflated) condition.

In forming the tube and spherical members assembly, an extruded tube material is cut to a given length. Prior to joining the opposite ends of the extruded tube material to form the tube, the desired amount of spherical members is placed on the extruded tube material.

The spherical members 16 are allowed to freely move in the tube 2 during operation of the vehicle. However, since the spherical members 16 are formed of foamed rubber or foamed urethane, and have an edgeless smooth shape, there is no possibility that the spherical members 16 will damage the tube 2. Further, no load is applied to the spherical members 16 during normal running, therefore the spherical members 16 will not be compressed or deteriorated by hardening. Accordingly, the spherical members 16 have an extended service life.

Figure 2:
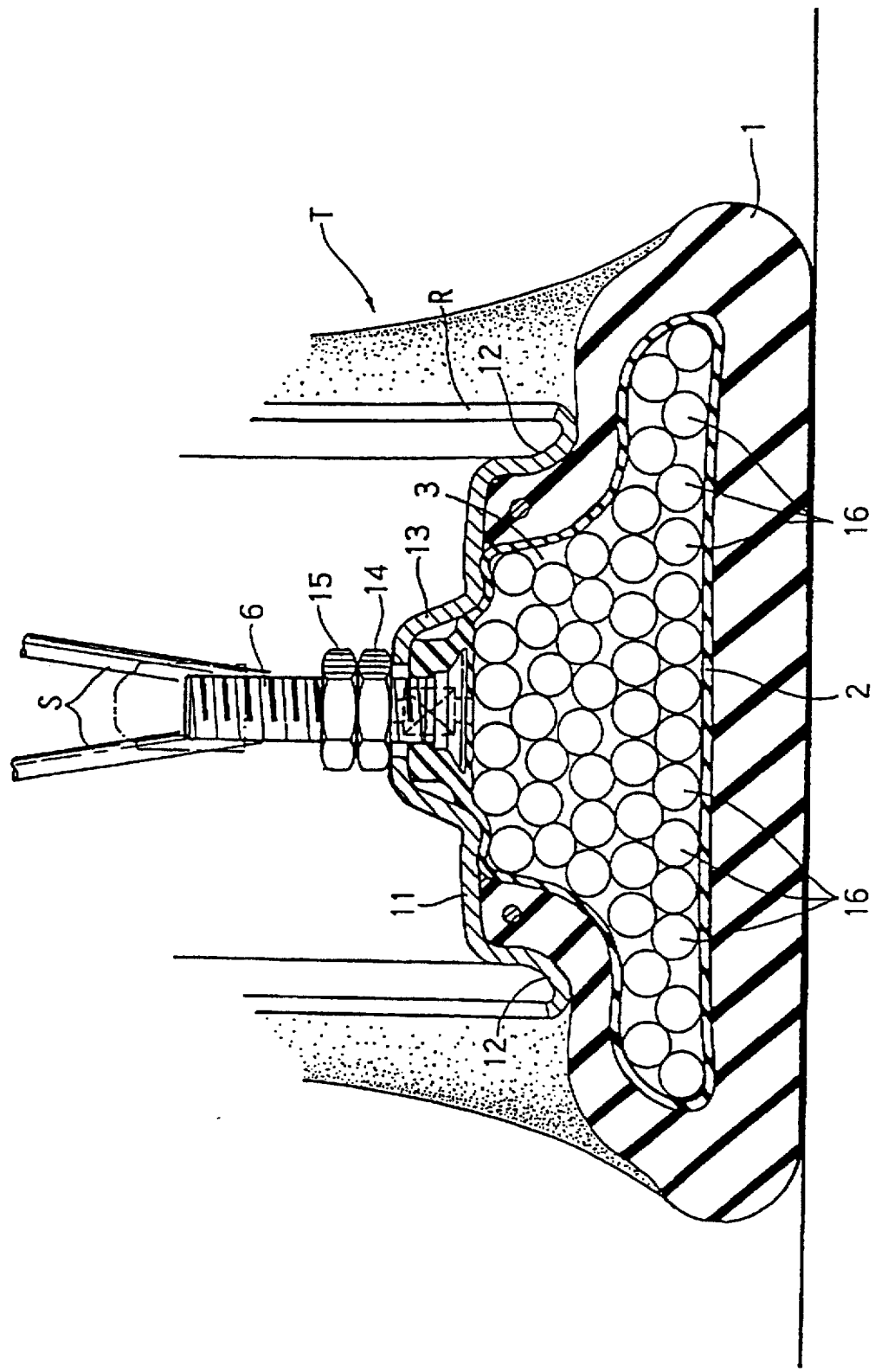
FIG. 2 is a view similar to FIG. 1, illustrating a punctured tube tire.

In the event that the tube tire T is pierced by a nail or similar object, the air in the air chamber 3 of the tube 2 will leak out. However, with the present invention, the outside shape of the tire 1 will be maintained to some extent because the plural spherical members 16 are present in the air chamber 3 of the compressed tube 2, as shown in FIG. 2. Therefore, a short distance trip to a repair shop is possible.

As mentioned above, the spherical members 16 are formed of foamed rubber or foamed urethane. Due to the edgeless smooth shape and high degree of elasticity, there is no possibility that the spherical members 16 will damage the tube 2, even during operation of the vehicle with the tire in a punctured condition.

Whenever the tube tire T runs over an obstacle on a road surface, the tire receives an impact. The tire 1 and the tube 2 are partially compressed in their radial direction by this impact. If the impact is great enough, the tire 1 and the tube 2 are pinched between the radially outward projecting flange portions 12 of the rim R and the obstacle. During a pinch, the opposed inner wall surfaces of the tube 2 come into contact with each other. In the present invention, the presence of the spherical members 16 can prevent contact between the opposed inner wall surfaces of the tube 2, thereby effectively preventing damage to the tube 2 or tire 1 due to a pinching of the tire 1 and tube 2 between the rim and obstacle.

The amount of the spherical members 16 in the air chamber 3 is preferably set in the range of 50% to 80% of the volume of the tube 2 in its expanded condition. If the amount is larger than the preferred range, elastic deformation of the tire 1 is hindered, resulting in an adverse affect on the comfort of the ride and a decrease in the responsiveness and handling of the vehicle. If the amount is smaller than the preferred range, the tire 1 becomes overly flat upon puncture and it becomes impossible to operate the vehicle further.

Figure 3:
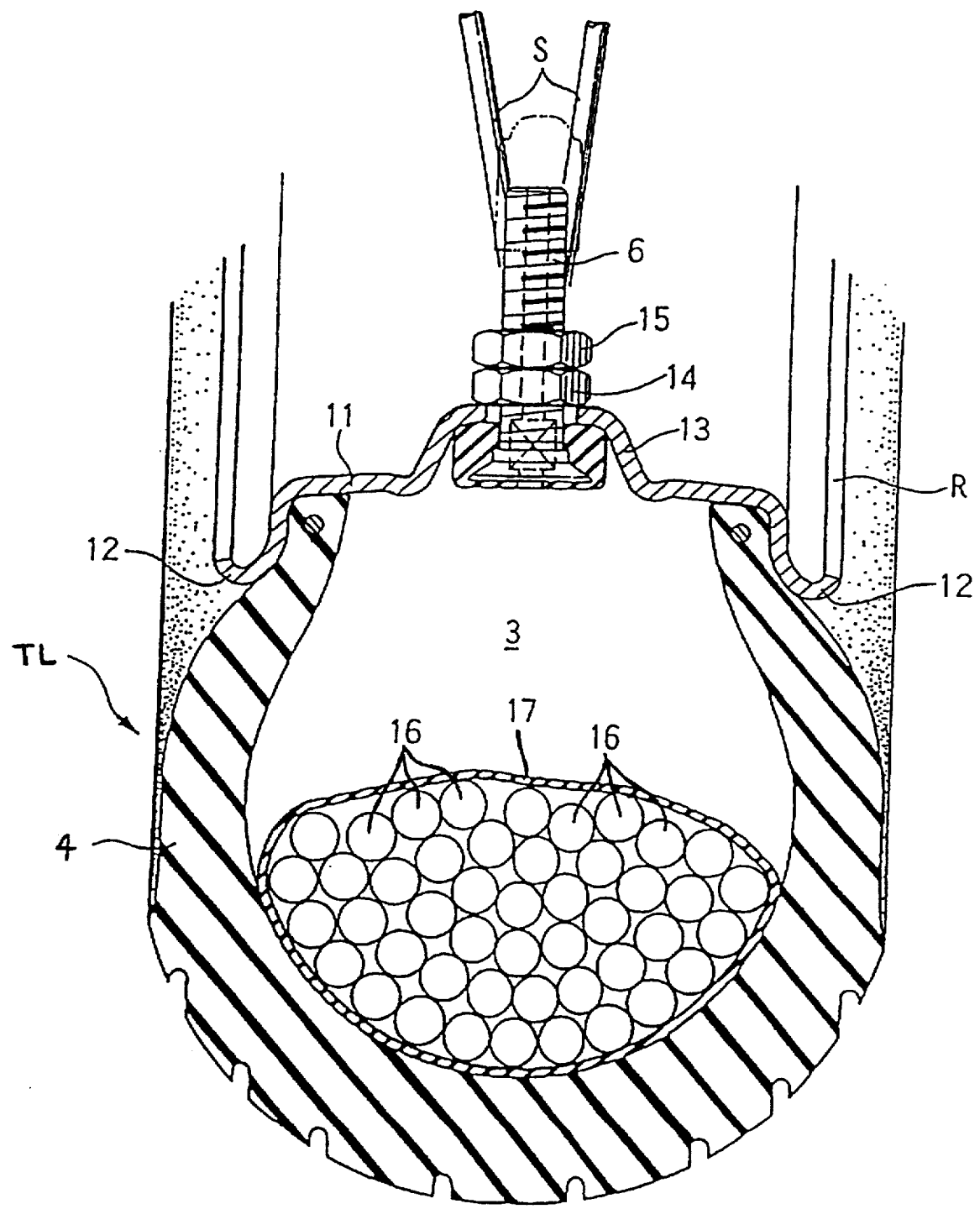
FIG. 3 is a transverse sectional view of a wheel on which a tubeless tire is mounted.

Referring to FIG. 3, the operation of the spherical members 16 in a tubeless tire TL will be explained. An inner circumferential opening, having a generally U-shaped cross-section, of a tire 4 is kept in pressure contact with the inner surfaces of right and left flange portions 12 of the rim R by the pressure of air charged in the air chamber 3 of the tire 4, thereby maintaining the air tightness of the air chamber 3.

A plurality of spherical members 16 formed of foamed rubber or foamed urethane are located in the air chamber 3. The spherical members 16 are separated into a plurality of groups. Each group is accommodated in a bag 17 formed from a thin film of rubber, nylon, or polyethylene. Plural bags 17, each filled with the spherical members 16, are accommodated in the tire 4, and the tire 4 is then mounted on the rim R. Thereafter, air is charged into the air chamber 3 of the tire 4. Since the spherical members 16 are grouped in bags 17, inserting the spherical members 16 into the tire 4 can be easily accomplished.

As with the tube tire T discussed above, if the tubeless tire TL is pierced by a nail or like object, the outside shape of the tire 4 will be maintained to some extent by the plural spherical members 16 present in the air chamber 3. Accordingly, a short distance trip to a repair shop is possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A tire inner tube comprising a plurality of elastic members contained therein, wherein a total volume of said plurality of elastic members is 50 to 80 percent of a volume of said tube when said tube is inflated to a size fitting the tire, and wherein at least one of said plurality of elastic members is free to move about inside said tube.

2. The tube of claim 1, wherein at least one of said plurality of elastic members is made of foamed rubber or foamed urethane.

3. The tube of claim 1, wherein at least one of said plurality of elastic members has an edgeless smooth shape.

4. The tube of claim 1, wherein at least one of said plurality of elastic members is spherical in shape.

5. A tire for a vehicle, the tire comprising:

a substantially U-shaped cross-section which opens towards a radial center of the tire and which extends in a continuous circle about the radial center of the tire; and an inner tube comprising a plurality of elastic members contained therein, said inner tube being located inside said U-shaped cross-section, wherein a total volume of said plurality of elastic members is 50 to 80 percent of a volume of said tube when said tube is inflated to a size fitting the tire, and wherein at least one of said plurality of elastic members is free to move about inside said tube.

6. The tire of claim 5, wherein at least one of said plurality of elastic members is made of foamed rubber or foamed urethane.

7. The tire of claim 5, wherein at least one of said plurality of elastic members has an edgeless smooth shape.

8. The tire of claim 5, wherein at least one of said plurality of elastic members is spherical in shape.

9. A vehicle wheel assembly comprising:

a rim;

a tire mounted on said rim;

an air chamber formed inside said tire;

a plurality of elastic members contained in said air chamber; and a tube inflated to a size fitting said tire and resting upon an inside surface of said tire and an outer surface of said rim, for defining said air chamber, wherein a total volume of said plurality of elastic members is 50 to 80 percent of a volume of said air chamber, and wherein at least one of said plurality of elastic members is free to move about inside said tube.

10. The vehicle wheel of claim 9, wherein at least one of said plurality of elastic members is made of foamed rubber or foamed urethane.

11. The vehicle wheel of claim 9, wherein at least one of said plurality of elastic members is spherical in shape.

* * * * *